Figure 1:
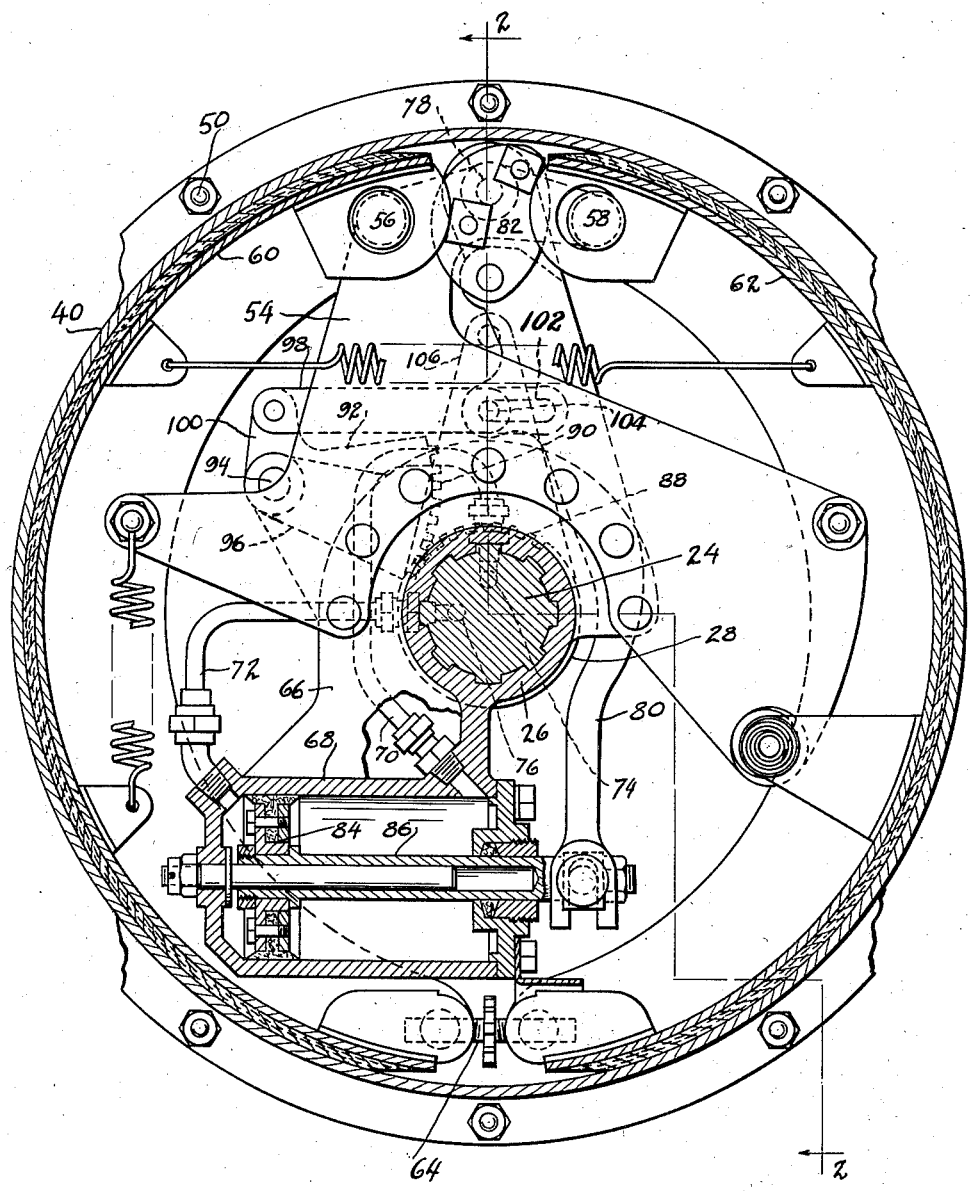

July 31, 1934.  V. G. APPLE  1,968,589
VEHICLE BRAKE
Filed Nov. 14, 1929   2 Sheets-Sheet 1

INVENTOR.
Vincent G. Apple
BY
Burton & McConkey
ATTORNEYS

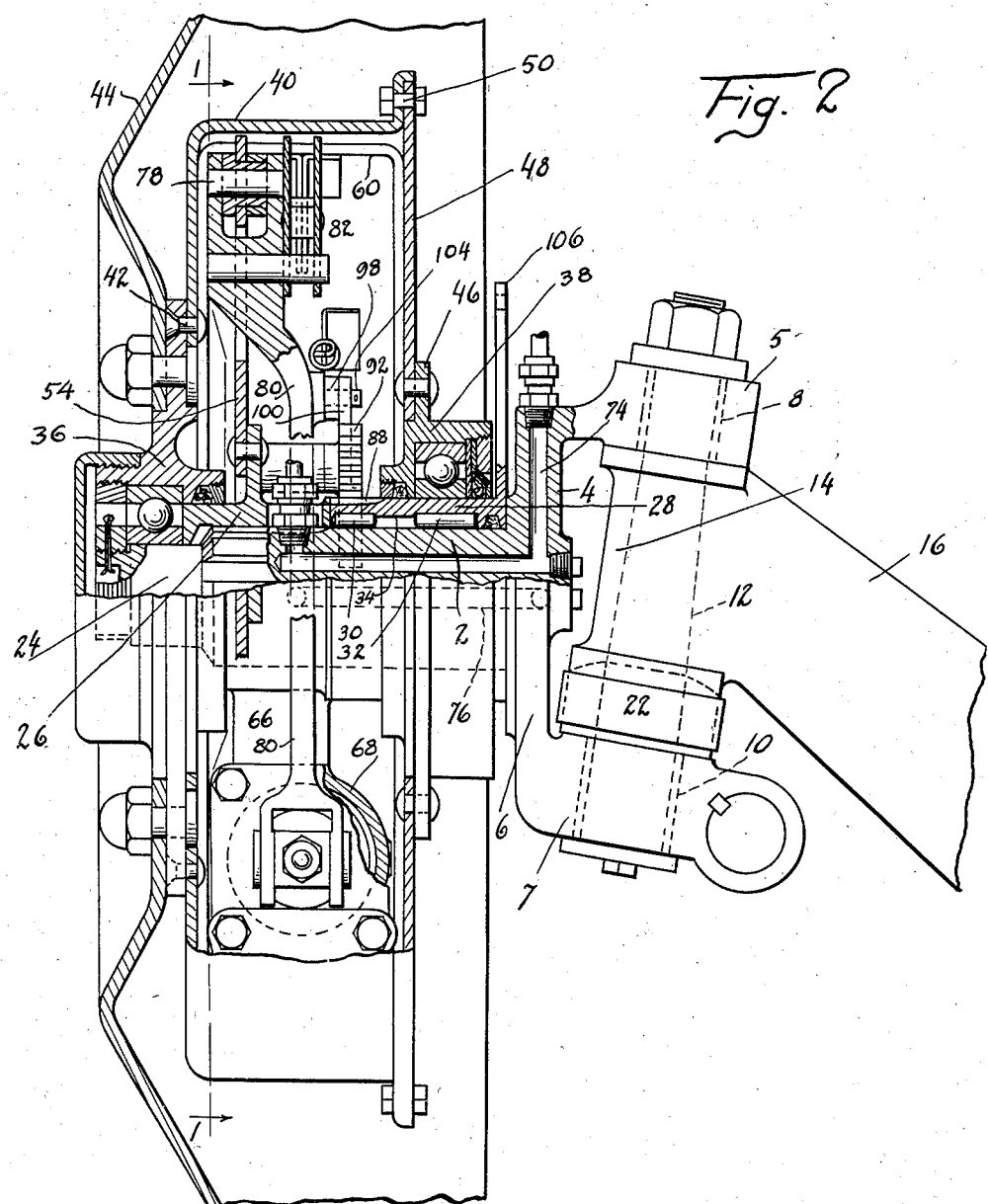

Patented July 31, 1934

1,968,589

UNITED STATES PATENT OFFICE 1,968,589

VEHICLE BRAKE

Vincent G. Apple, Dayton, Ohio, assignor to Bendix Brake Company, South Bend, Ind., a corporation of Illinois Application November 14, 1929, Serial No. 407,081

8 Claims. (Cl. 188—106)

My invention relates to brakes and has particular reference to that type used on automotive vehicles.

An object of my invention is to enhance the efficiency of a completely enclosed water and dust proof vacuum power brake assembly such as is disclosed in my copending application Serial Number 407,085, filed November 14, 1929 by making provision for manual application thereof in conjunction with the power actuating means, and the possible emergency created in case the power to guard against operating means should for any reason fail to function by so arranging the means for manually applying the brakes that it will function independently of the power means and may be connected by the customary mechanical linkage, from a point outside the drum enclosure, to the conventional brake operating pedal.

Further objects and meritorious features of my invention will become apparent from the following description, taken in conjunction with the accompanying drawings wherein like numerals refer to like parts throughout the several figures, and wherein Fig. 1 is a transverse section taken on the line 1—1 of Fig. 2, and Fig. 2 is a verical axial section taken on the line 2—2 of Fig. 1.

Numeral 2 in the drawings represents the usual steering spindle having radially extending arms 4 and 6 and carrying the hubs 5 and 7 for the bushings 8 and 10 respectively.

The steering pivot pin 12 is secured to the hub 14 of the axle 16 and rotatably mounted in the bushings 8 and 10, with the anti-friction thrust bearings 22 under the hub 14 for the purpose of taking the vertical steering load.

On the outer end of the stub axle, or spindle, 24 is keyed to the brake torque plate 26, and the sleeve 28 is rotatably journalled on the inner end thereof by means of the roller bearings 30 and 32, which are retained in spaced relation by means of the spacing member 34. Secured to the outer and inner ends of the wheel and drum assembly are the bearing housings 36 and 38 respectively whereby the said assembly is rotatably journalled on the stub axle 24, bearing directly on the stub axle at its outer end and upon the sleeve 28 at its inner end.

The brake drum 40 is riveted as at 42 to the wheel 44. The inner bearing housing 38 is provided with a flange 46, and to this flange and the brake drum 40 is bolted the drum cover plate 48, as at 50. The brake torque plate 26 is provided with a plurality of radially extending arms, one of which, 54, carries the studs 56 and 58 which serve as anchors for the brake shoes 60 and 62 respectively. The other two adjacent ends of the brake shoes are connected by the right and left adjusting screw 64. Inasmuch as the entire brake drum rotates in the described construction it becomes impossible to utilize the customary backing plate as a mounting for the brake operating parts. The arms extending radially from the torque plate 26 here serve as a support for the brake operating parts and hence it is necessary that I use brake shoes which are channel shaped in cross section, as clearly illustrated in Fig. 1, in lieu of the conventional T-shaped brake structure so that there will be room for mechanism described more fully hereafter.

Secured to the depending flange 66 at the brake torque plate 26 is the fluid pressure cylinder 68 to which is connected the inlet and outlet conduits 70 and 72 respectively. These conduits are in turn connected to similar conduits 74 and 76 which extend transversely through the spindle 24 and are connected to a conventional fluid supply source. The flow of the fluid to the cylinder is to be controlled by the operator through some suitable means, not shown here because it forms no part of the present invention.

Secured to the arm 54 of the brake torque plate 26 is a third stud 78 on which is fulcrumed the brake operating arm 80, and to this brake arm is pivoted the camming mechanism, broadly indicated at 82 since it forms no part of the present invention, for expanding the brake shoes 60 and 62 against the inner periphery of the rotating drum.

The fluid pressure cylinder 68 is provided with a piston 84 and a piston stem 86, to the outer extremity of which the brake arm 80 is coupled. Thus the operation of the fluid pressure device functions to actuate the camming means to apply the brakes.

In combination with this power brake assembly I have included means for mechanically actuating the brake operating arm 80 either in conjunction with or independently of the fluid pressure means. For this purpose I have provided the outer end of the sleeve 28 with gear teeth 88 which are adapted to mesh with the gear teeth 90 on the sector lever 92. This sector lever is pivoted at 94 to the boss 96 which is formed on the brake torque plate 26. A link 98 connects the lever arm 100 of the gear sector to the brake operating arm 80 through the medium of an elongated slot 102 in the link which fits over a stud 104 in the brake operating arm. In this way a slip joint is provided between the brake arm and the sector whereby the said arm may be actuated either independently or in conjunction with the fluid pressure means. A lever 106 is secured to the other end of the sleeve 28, preferably by welding it thereto, for the purpose of permitting actuation of the brake arm through the gear sector from a point outside the closed brake drum, and it is contemplated that this lever 106 will be connected through some mechanical linkage so that it may be manually operated by the vehicle driver. This gear sector arrangement is shown in connection with an electric power device in my copending application Serial Number 407,085, filed November 14, 1929 and there claimed.

Having illustrated and described a preferred embodiment of my invention, various changes and modifications will be apparent to those skilled in the art and for that reason I intend to limit myself only within the scope of the appended claims.

I claim:

1. Brake mechanism comprising a swivelled wheel axle, an integral closed drum rotatably mounted thereon, radially expansible friction means and fluid pressure means for expanding them supported against rotation therein, and mechanical means operable from a point outside the drum for expanding the friction means independently of the fluid pressure means.

2. Brake mechanism comprising a swivelled wheel axle held against rotation by one end, a hub secured against rotation thereon, a sleeve rotatably mounted thereon adjacent said hub, a closed drum rotatably journalled on said sleeve and hub, radially expansible friction means and fluid pressure means for expanding them supported within the drum by said hub, and means carried by said sleeve for mechanically expanding the friction means independently of the fluid pressure means.

3. Brake mechanism comprising a swivelled wheel axle, a sleeve rotatably journalled thereon, a hub secured against rotation thereon, a closed drum rotatably journalled on said sleeve and hub, brake shoes and a fluid pressure cylinder supported by said hub, operative connections between the shoes and the cylinder, a lever arm on said sleeve outside said drum, and means coupling the sleeves with said operative connections whereby the brake shoes may be manually operated independently of the fluid pressure cylinder.

4. Brake mechanism comprising a swivelled wheel spindle, a hub secured against rotation thereon, a closed drum rotatably journalled thereabout, friction means and fluid pressure mechanism for applying them supported by the hub, and means disconnectedly coupled with the friction means and rotatable about said axle from outside the drum for applying the friction means independently of the fluid pressure mechanism.

5. Brake mechanism comprising a swivelled wheel spindle, a closed drum rotatably journalled thereon, radially expansible friction shoes non-rotatably supported within the drum, a fluid pressure device likewise supported therein, operative connections between the fluid pressure device and the friction shoes for expanding the latter, a sleeve extending from within to a point outside the drum and associated with means disconnectedly coupled with the operative connections for expanding the friction shoes independently of the fluid pressure device.

6. Brake mechanism comprising a wheel spindle, radially expansible brake shoes secured against rotation in relation thereto, a sleeve rotatably journalled thereon and provided with gear teeth at one end and actuating means at the other end, a cam actuating arm supported by said spindle to expand the shoes, a gear sector meshing with said sleeve teeth and having a slotted connection with the camming arm, and a fluid pressure device supported by said spindle and operable through said camming arm to expand the brake shoes.

7. Brake mechanism comprising a swivelled wheel spindle, a closed drum rotatably mounted thereon, radially expansible friction shoes supported on said spindle within the drum enclosure, camming means to expand the shoes and a fluid pressure device supported within the drum adjacent opposite sides of the drum periphery by said spindle, a cam actuating arm extending substantially diametrically across the drum connecting said camming means and pressure device, a sleeve rotatably journalled about the spindle and operably connected to the camming arm by means including a slip joint, whereby said shoes may be radially expanded independently of the fluid pressure device.

8. In combination with a swivelled wheel structure including brake mechanism and a cam for actuating the same, fluid power means entirely within the plane of said swivelled wheel operable to actuate the cam, and manually operable means to actuate said cam independently of said power means.

VINCENT G. APPLE.